3,146,247
COMPLEX OF ALKALI METAL CYANIDE AND ALKYL-ALUMINUM DIHALIDE
Wolf R. Kroll, Linden, N.J., assignor to Continental Oil Company, Ponca City, Okla., a corporation of Delaware
No Drawing. Filed Jan. 5, 1961, Ser. No. 80,753
10 Claims. (Cl. 260—448)

This invention relates to novel complexes of alkali metal cyanide and organo-aluminum dihalide and method for the preparation of said complex.

It is an object of this invention to provide a novel complex of alkali metal cyanide and organo-aluminum dihalide.

It is another object of this invention to provide a process for the preparation of complex of alkali metal cyanide and organo-aluminum dihalide.

Still another object of this invention is to provide a novel complex of sodium cyanide and alkylaluminum dichloride and process for the preparation of said complex.

These and other objects of the invention will become more readily apparent from the following detailed description and discussion.

The compositions of this invention are defined broadly by the formula $MeCN \cdot 2RAlXX_1$ wherein Me is an alkali metal, R is an organic radical, and X and $X_1$ are halogens.

Any of the alkali metal cyanides can be employed in the preparation of the complexes of this invention; however the preferred cyanides are those of sodium and potassium and particularly sodium.

The amount of alkali metal cyanide employed in preparing the complex should be sufficient to react with all of the organo-aluminum dihalide. Generally, it is preferred to use the theoretical amount required for the complex; however the complexes formed if an excess of either reactant is employed.

The organo radical of the organo-aluminum dihalide is selected broadly from organic radicals but is preferably a hydrocarbon radical, e.g., an alkyl radical or cycloalkyl, aryl, alkaryl, or aralkyl radical. Ordinarily, the hydrocarbon radical contains from about 2 to about 30 carbon atoms. The organo-aluminum dihalides can contain any of the halogens with chlorine and bromine ordinarily being preferred. While the halogens are ordinarily alike, it is within the scope of the invention to utilize dihalide containing different halogens. A few examples of specific aluminum dihalides which can be employed include compounds suh as methylaluminum dichloride, ethylbenzyl di-iodide, cyclohexyl aluminum dichloride, isobutyl aluminum dichloride, phenylaluminum dibromide, methyl cyclopentyl aluminum dichloide, cyclo-octyl aluminum dichloride, naphthyl aluminum dibromide, dodecylaluminum di-iodide, and the like. Of the organo-aluminum dihalides, those more often employed are the lower molecular weight alkylaluminum dichlorides, such as ethylaluminum dichloride.

The complexes are prepared by reacting the alkali metal cyanide and organo-aluminum dihalide, usually at a temperature of from about 60 to about 160° C., and preferably from about 105° C. to about 140° C. The preferred reaction temperature will vary, depending on the particular complex. Usually, it is desirable that the complex be in the liquid state, and temperatures are preferably selected for this purpose. The reaction is ordinarily carried out at atmospheric pressure; however other pressures, either above or below atmospheric, can be employed. The reaction can be carried out in the presence of a solvent for the reactants, whereby improved contact between the reactants is obtained. Any of the conventional aromatic or aliphatic solvents can be used for this purpose, particularly aromatic solvents, such as benzene, xylene, and the like.

The following examples are presented in illustration of the invention:

*Example 1*

One gram of sodium cyanide and 5 ml. of ethylaluminum dichloride were heated gradually up to 90° C. at which point a portion of the solid cyanide disappeared. The mixture was then further heated to 120 and then up to 140° C. At this point, the solid mass had disappeared, and a clear viscous liquid was formed. The liquid remained in this state when the temperature was reduced to room temperature. Analysis of the liquid showed a complex having substantially the formula $NaCN \cdot 2AlC_2H_5Cl_2$.

When the same complex was prepared using xylene as a solvent, it was found that the complex had a solubility of approximately 8 grams in 100 grams of xylene.

*Example 2*

One gram of potassium cyanide and 5 ml. of ethylaluminum dichloride were heated in the same manner as Example 1 up to 145° C. The reaction time was two hours. The reaction product was liquid; however on cooling, some crystalline needles precipitated. Analysis of the product showed a complex having the formula

$$KCN \cdot 2AlC_2H_5Cl_2$$

It was determined that the product complex had a melting point of about 102° C. The complex was very stable against decomposition, remaining undecomposed at temperatuers up to 150° C. at 0.1 mm. pressure.

When the complex was prepared in xylene, it was found to have a solubility of about 1.5 grams in 100 grams of the xylene.

The complexes of this invention can be used with advantage as catalysts in the Friedel-Crafts reaction for alkylation and isomerization and also for separation purposes when organo-aluminum dihalides are removed from a reaction mixture. The complexes have excellent electrical conductivities and therefore can also find use in the polymerization of alpha-olefins. The complexes are solids at lower temperatures, depending on the particular complex, and have definite melting points. Depending again on the particular complex, the compositions of this invention are relatively stable against decompositions at elevated temperatures.

Having thus described the invention by providing specific examples thereof, it is to be understood that no undue limitations or restrictions are to be drawn by reason thereof and that many variations and modifications are within the scope of the invention.

I claim:

1. As a new composition of matter, a complex compound of alkali metal cyanide and a lower molecular weight alkyl aluminum dihalide, said alkali metal being selected from the group consisting of sodium and potassium in which the mole ratio of lower molecular weight alkyl aluminum dihalide to alkali metal cyanide is substantially 2:1.

2. The composition of claim 1 in which the alkali metal cyanide is sodium cyanide and the lower molecular weight alkyl aluminum dihalide is ethylaluminum dichloride.

3. The composition of claim 1 in which the alkali metal cyanide is potassium cyanide and the lower molecular weight alkyl aluminum dihalide is ethylaluminum dihalide.

4. A process for the prepartion of a complex having the formula $MeCN \cdot 2RAlXX_1$ wherein Me is an alkali metal selected from the group consisting of sodium and potassium, R a lower molecular weight alkyl group and X and $X_1$ are halogens, which comprises reacting an alkali metal cyanide in which the alkali metal is selected from the group consisting of sodium and potassium with a lower molecular weight alkyl aluminum dihalide at a temperature from about 60 to 160° C.

5. The process of claim 4 in which the reaction is carried out in the presence of a hydrocarbon solvent.

6. The process of claim 5 in which the alkali metal cyanide is sodium cyanide and the lower molecular weight alkyl aluminum dihalide is ethylaluminum dichloride.

7. The process of claim 5 in which the alkali metal cyanide is potassium cyanide and the lower molecular weight alkyl aluminum dihalide is ethylaluminum dihalide.

8. A process for the preparation of a complex having the formula $MeCN \cdot 2RAlXX_1$ wherein Me is an alkali metal selected from the group consisting of sodium and potassium, R a lower molecular weight alkyl group and X and $X_1$ are halogens, which comprises reacting an alkali metal cyanide in which the alkali metal is selected from the group consisting of sodium and potassium with a lower molecular weight alkyl aluminum dihalide at a temperature from about 100 to about 140° C.

9. The process of claim 8 in which the alkali metal cyanide is sodium cyanide and the lower molecular weight alkyl aluminum dihalide is ethylaluminum dichloride.

10. The process of claim 8 in which the alkali metal cyanide is potassium cyanide and the lower molecular weight alkyl aluminum dihalide is ethylaluminum dihalide.

References Cited in the file of this patent

Liebigs: Annalen der Chemie, vol. 629 (March 1960), pages 33 to 49.